(12) United States Patent
Lee

(10) Patent No.: US 11,784,597 B2
(45) Date of Patent: Oct. 10, 2023

(54) SYSTEM AND METHOD FOR CONTROLLING OUTPUT

(71) Applicant: HYUNDAI MOBIS CO., LTD., Seoul (KR)

(72) Inventor: Yong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/832,887

(22) Filed: Jun. 6, 2022

(65) Prior Publication Data
US 2023/0261597 A1    Aug. 17, 2023

(30) Foreign Application Priority Data
Feb. 16, 2022    (KR) .................... 10-2022-0020028

(51) Int. Cl.
*H02P 23/14* (2006.01)

(52) U.S. Cl.
CPC .................................. *H02P 23/14* (2013.01)

(58) Field of Classification Search
CPC ......... H02P 23/14; H02P 27/04; H02P 29/664
USPC .................................................. 318/139, 34
See application file for complete search history.

(56) References Cited

U.S. PATENT DOCUMENTS

| | | | | |
|---|---|---|---|---|
| 7,863,838 B2* | 1/2011 | Aso | .......................... | B60L 58/20 |
| | | | | 307/151 |
| 8,853,989 B2* | 10/2014 | Umayahara | ....... | H01M 8/04567 |
| | | | | 363/55 |
| 10,720,875 B2* | 7/2020 | Chae | ........................ | H02P 25/08 |
| 11,108,352 B2* | 8/2021 | Lan | .......................... | B60L 15/20 |
| 2002/0097020 A1 | 7/2002 | Ueno et al. | | |
| 2017/0066337 A1 | 3/2017 | Kazuno et al. | | |
| 2020/0055422 A1 | 2/2020 | Lee et al. | | |
| 2021/0111422 A1 | 4/2021 | Park et al. | | |
| 2021/0188129 A1 | 6/2021 | Ichikawa | | |
| 2021/0237575 A1 | 8/2021 | Ichikawa | | |

FOREIGN PATENT DOCUMENTS

| | | |
|---|---|---|
| EP | 1 225 082 A2 | 7/2002 |
| JP | 2002-218607 A | 8/2002 |
| JP | 2021-100346 A | 7/2021 |
| KR | 10-0746367 B1 | 8/2007 |
| KR | 10-2020-0020513 A | 2/2020 |
| KR | 10-2021-0044631 A | 4/2021 |

OTHER PUBLICATIONS

Extended European Search Report dated Nov. 29, 2022, in counterpart European Patent Application No. 22177230.4 (9 Pages in English).
Korean Office Action dated May 9, 2023, in counterpart Korean Patent Application No. 10-2022-0020028 (6 pages in Korean).

* cited by examiner

*Primary Examiner* — David Luo
(74) *Attorney, Agent, or Firm* — NSIP Law

(57) ABSTRACT

An output control system includes a first power controller controlling an output of a first power source, a second power controller controlling an output of a second power source, and a controller determining a control mode based on a state of a motor and controlling one or both of the first power controller and the second power controller based on the control mode.

13 Claims, 10 Drawing Sheets

SYSTEM AND METHOD FOR CONTROLLING OUTPUT

CROSS-REFERENCE TO RELATED APPLICATION

This application claims the benefit of priority to Korean Patent Application No. 10-2022-0020028, filed in the Korean Intellectual Property Office on Feb. 16, 2022, the entire contents of which are incorporated herein by reference.

TECHNICAL FIELD

The present disclosure relates to a system and a method for controlling an output.

BACKGROUND

A fuel cell has high power generation efficiency compared to the existing power generation method and does not emit pollutants upon generating a power. For this reason, generally, the fuel cell is evaluated as a future power generation technology and is being studied as a power source capable of solving energy conservation and pollution problems.

When the fuel cell is used only as a power source for a vehicle or a non-vehicle, the fuel cell may supply electric energy to all loads of the vehicle or the non-vehicle. In this case, the reduction of performance of the vehicle or non-vehicle may occur when the efficiency of the fuel cell efficiency is low. In addition, due to the output characteristic of the fuel cell in which an output voltage rapidly decreases in a high-speed driving region requiring a high voltage, the fuel cell may fail to sufficiently supply a voltage required by a motor, thereby reducing the performance of acceleration of the vehicle or non-vehicle.

To solve the above-described problems, in general, there is used a manner in which a fuel cell and a battery are provided together as a power source of a non-vehicle such that the outputs thereof are supplemented.

A driving mode of a motor transitions depending on a state of the motor; in this case, it is necessary to control outputs and currents of a fuel cell and a battery used as power sources in the process of switching the driving mode. In particular, because a motor applied to a non-vehicle such as construction equipment and logistics equipment is lower than the motor applied to a vehicle in specifications and maximum output, the transition of the driving mode of the motor may occur frequently. In this case, there is a need to rapidly adjust the output of the fuel cell, but it is difficult to cope with a sudden change in the output of the fuel cell.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made to solve the above-mentioned problems occurring in the prior art while advantages achieved by the prior art are maintained intact.

An aspect of the present disclosure provides an optimally controlled outputs of the fuel cell and the battery.

The technical problems to be solved by the present disclosure are not limited to the aforementioned problems, and any other technical problems not mentioned herein will be clearly understood from the following description by those skilled in the art to which the present disclosure pertains.

In one general aspect, an output control system includes a first power controller that controls an output of a first power source, a second power controller that controls an output of a second power source, and a controller that determines a control mode based on a state of a motor and controls one or both of the first power controller and the second power controller based on the control mode.

The first power source may be a battery, and the second power source may be a fuel cell.

The controller may control an operation of the motor based on the state of the motor.

The controller may control the motor to operate in one of a short-time output mode, a continuous output mode, and a standby mode.

The control mode may include one of a first control mode, a second control mode, and a third control mode, and the controller may determine the control mode based on a temperature of the motor.

The controller may determine the control mode to be the first control mode, when the temperature of the motor is a first temperature or more. The controller may determine the control mode to be the second control mode, when the temperature of the motor is less than the first temperature and is a second temperature or more. The controller may determine the control mode to be the third control mode, when the temperature of the motor is less than the second temperature.

In the first control mode, the controller may allow the first power controller to control the output of the first power source such that a minimum output is provided and may allow the second power controller to control the output of the second power source based on the state of the motor.

In the second control mode, the controller may allow the second power controller to fix the output of the second power source to a given value and may allow the first power controller to control the output of the first power source based on the state of the motor.

The given value may be an output value of the motor in a continuous output mode.

In another general aspect, an output control method includes determining a control mode based on a state of a motor, and controlling one or both of an output of a first power source and an output of a second power source based on the control mode.

The control mode may include one of a first control mode, a second control mode, and a third control mode, and the determining of the control mode may include determining the control mode to be the first control mode when the state of the motor is a first temperature or more, determining the control mode to be the second control mode when the state of the motor is less than the first temperature and is a second temperature or more, and determining the control mode to be the third control mode when the state of the motor is less than the second temperature.

In the second control mode, the output of the second power source may be fixed to a given value, and the output of the first power source may be controlled based on the state of the motor.

In the third control mode, the output of the first power source may be controlled to be set to a minimum output, and the output of the second power source may be controlled based on the state of the motor.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
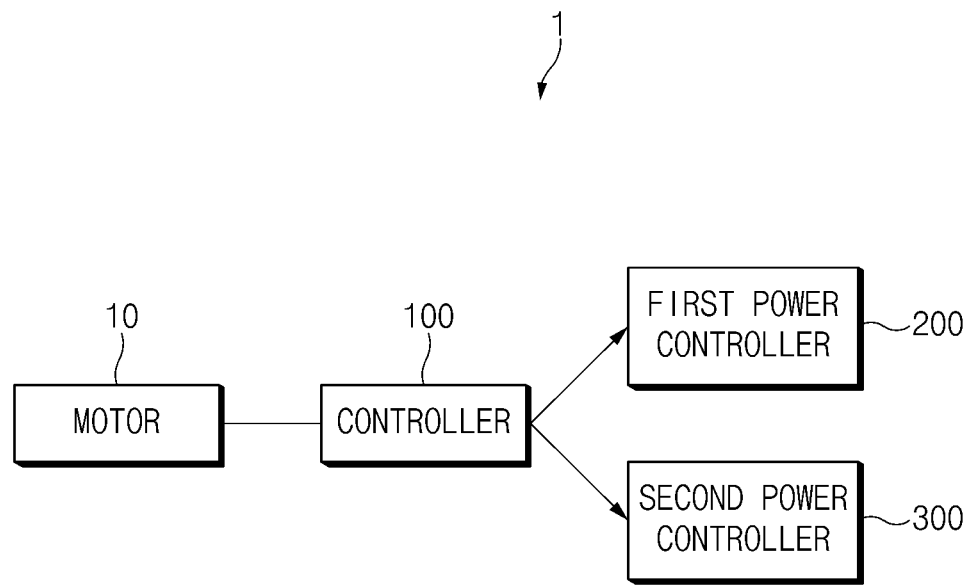
FIG. 1 is a diagram illustrating an output control system according to an embodiment of the present disclosure.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

In this specification, the singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

Each component (e.g., a module or a program) of components described in this specification may include a single entity or a plurality of entities. According to various embodiments, one or more components of the corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

The term "module" used herein may include a unit that is implemented with hardware, software, or firmware, and may be interchangeably used with the terms "logic", "logical block", "part", or "circuit". The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented with software (e.g., a program or an application) including one or more instructions stored in a storage medium (e.g., a memory) readable by a machine. For example, the processor of a machine may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

FIG. 1 is a diagram illustrating an output control system according to an embodiment of the present disclosure.

Referring to FIG. 1, an output control system 1 may include a controller 100, a first power controller 200, and a second power controller 300.

According to an embodiment, the output control system 1 may be applied to a non-vehicle (e.g., a forklift or an excavator) such as construction equipment and logistics equipment and may supply an output of a motor 10 by controlling an output of a first power source and/or a second power source.

According to an embodiment, the first power controller 200 may control the output of the first power source, and the second power controller 300 may control the output of the second power source.

According to an embodiment, the first power source may be a battery, and the second power source may be a fuel cell. The battery may include a low-voltage battery and/or a high-voltage battery. For example, the low-voltage battery may provide a voltage of 12 V, and the high-voltage battery may provide a voltage of 240 V. Below, a battery that is referred to as a "first power source" may mean a high-voltage battery. In this case, for example, the first power controller 200 may include a bi-directional high voltage DC-DC converter (BHDC) for controlling a battery, and the second power controller 300 may include a fuel-cell controlling unit (FCU) for controlling a fuel cell.

According to an embodiment, the controller 100 may determine a control mode based on a state(s) of a motor, and may control at least one of the first power controller 200 or the second power controller 300 based on the control mode. The state(s) of the motor may include, for example, a temperature of the motor, a current flowing to the motor, an output of the motor, a driving time of the motor, or the like. The controller 100 may control the first power controller 200 and/or the second power controller 300 mutually or independently depending on the control mode.

According to an embodiment, the controller 100 may be a hardware device such as a processor or a central processing unit (CPU) or may be software or a program implemented by a hardware device. Also, the controller 100 may be connected with each component of the output control system 1 to perform an overall function of the output control system 1.

According to an embodiment, the controller 100 may include an inverter. The inverter may include an electronic device that is supplied with the output of the first power source and the output of the second power source and converts and outputs the outputs into electrical energy for driving the motor 10.

According to an embodiment, the controller 100 may control an operation of a motor based on a state(s) of the motor. In this case, the output of the motor 10 may be equal to a sum of the output of the first power source and the output of the second power source. That is, the output of the motor 10 may be composed of the output of the first power source and the output of the second power source.

According to an embodiment, the controller 100 may allow the motor 10 to operate in one of a short-time output mode, a continuous output mode, and a standby mode. The controller 100 may determine a driving mode of the motor 10 based on a state(s) of the motor 10. The short-time output mode may include a mode in which the motor 10 is driven with a maximum output, and the continuous output mode may include a mode in which the motor 10 is driven with an output capable of operating stably during a long time. Also, the standby mode may include a mode in which the motor 10 is driven with an output between the output in the short-time output mode and the output in the continuous output mode. The controller 100 may control the operation of the motor 10 based on a temperature of the motor 10 such that the motor 10 operates in the continuous output mode when the temperature of the motor 10 is 100 degrees or more and operates in the standby mode when the temperature of the motor 10 is less than 100 degrees.

According to an embodiment, the control mode may include a first control mode, a second control mode, and a third control mode, and the controller 100 may determine the control mode based on a result of comparing a state of the motor 10 and a given temperature.

According to an embodiment, when the state of the motor 10 is a first temperature or more, the controller 100 may determine the control mode to be the first control mode; when the state of the motor 10 is less than the first temperature and is a second temperature or more, the controller 100 may determine the control mode to be the second control mode; when the state of the motor 10 is less than the second temperature, the controller 100 may determine the control mode to be the third control mode. In this case, the first temperature may be set to be higher than the second temperature, and the second temperature may be set to be higher than the third temperature.

According to an embodiment, the control mode may include the continuous output mode, the standby mode, or the short-time output mode so as to correspond to the driving mode of the motor 10. For example, the first control mode may correspond to the continuous output mode, the second control mode may correspond to the standby mode, and the third control mode may correspond to the short-time output mode.

According to an embodiment, the controller 100 may control a current from the first power source and a current from the second power source so as to correspond to the output control of the first power source and the second power source.

Figure 2:
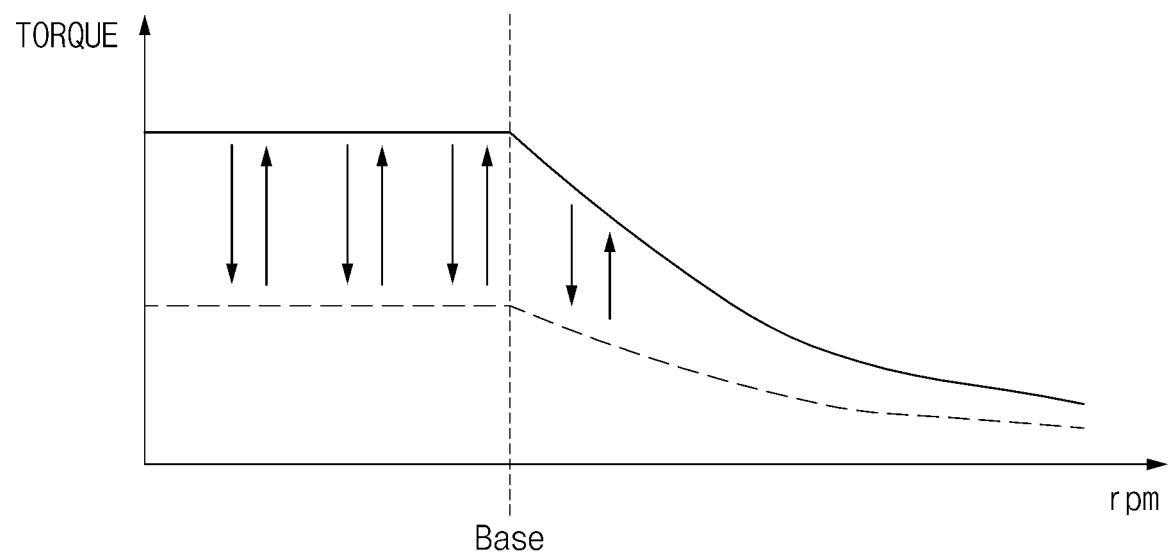
FIG. 2 is a diagram illustrating an output change of a motor according to an embodiment of the present disclosure.

FIG. 2 is a diagram illustrating an output change of a motor according to an embodiment of the present disclosure.

Referring to FIG. 2, a mode of the motor 10 may repeatedly transition between the continuous output mode and the short-time output mode based on a state of the motor 10. For example, the driving mode of the motor 10 may transition based on a temperature of the motor 10. In FIG. 2, a graph depicted by a solid line indicates a relationship between a torque and revolutions per minute (rpm) of the motor 10 in the short-time output mode, and a graph depicted by a dashed line indicates a relationship between a torque and revolutions per minute (rpm) of the motor 10 in the continuous output mode. In this case, the area defined by the horizontal axis, the vertical axis, and the graph may indicate an output of the motor 10. In FIG. 2, an arrow indicates a mode transition between the continuous output mode and the short-time output mode in which the motor 10 is driven.

Figure 3A:
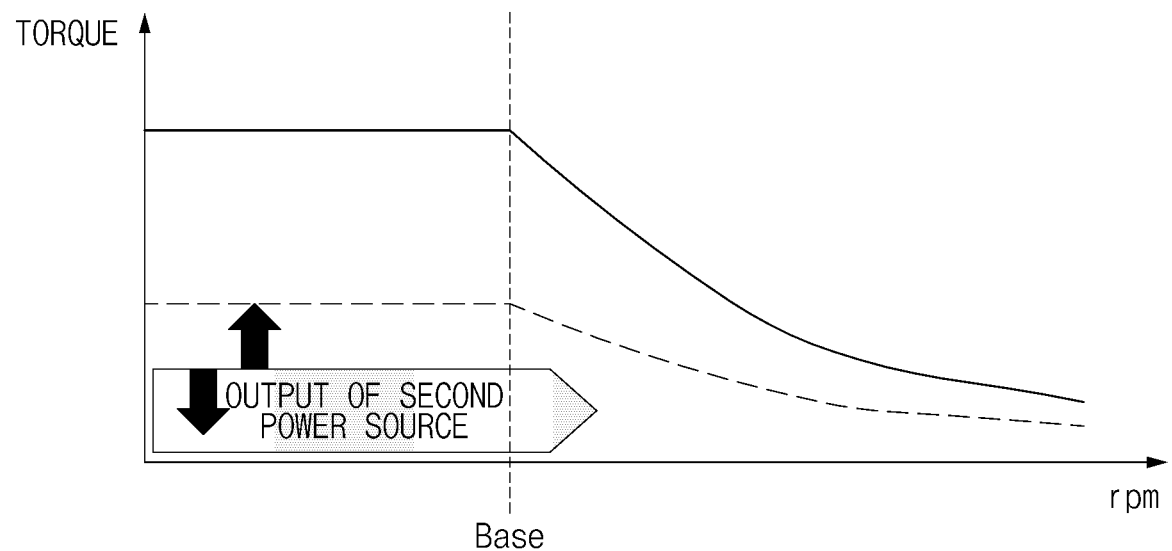
FIG. 3A is a diagram illustrating an example of a motor output in a first control mode of an output control system according to an embodiment of the present disclosure.

FIG. 3A is a diagram illustrating an example of a motor output in a first control mode of an output control system according to an embodiment of the present disclosure.

Figure 3B:
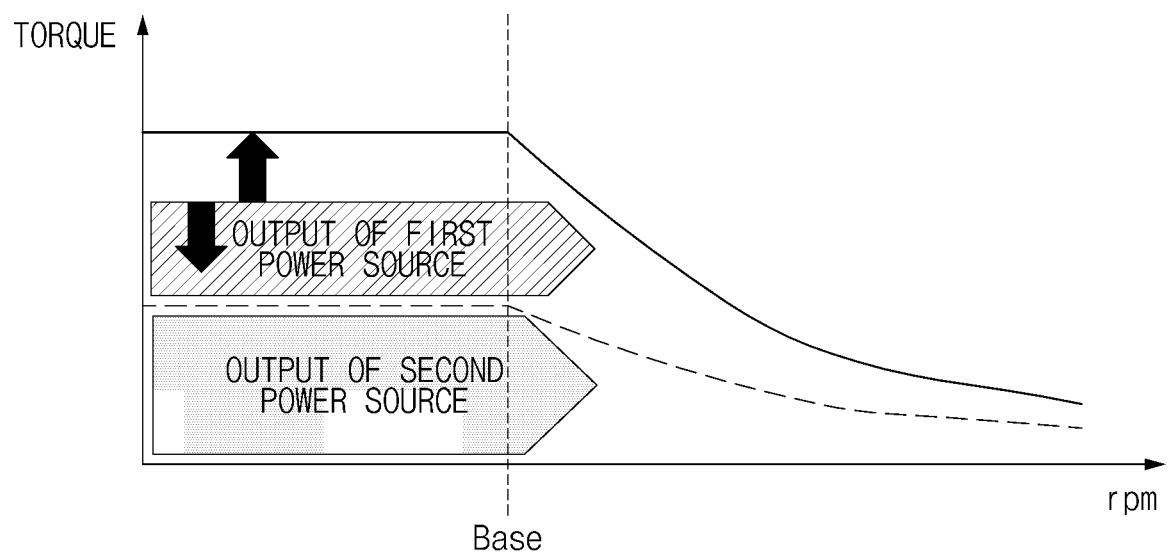
FIG. 3B is a diagram illustrating an example of a motor output in a second control mode of an output control system according to an embodiment of the present disclosure.

FIG. 3B is a diagram illustrating an example of a motor output in a second control mode of an output control system according to an embodiment of the present disclosure.

Figure 3C:
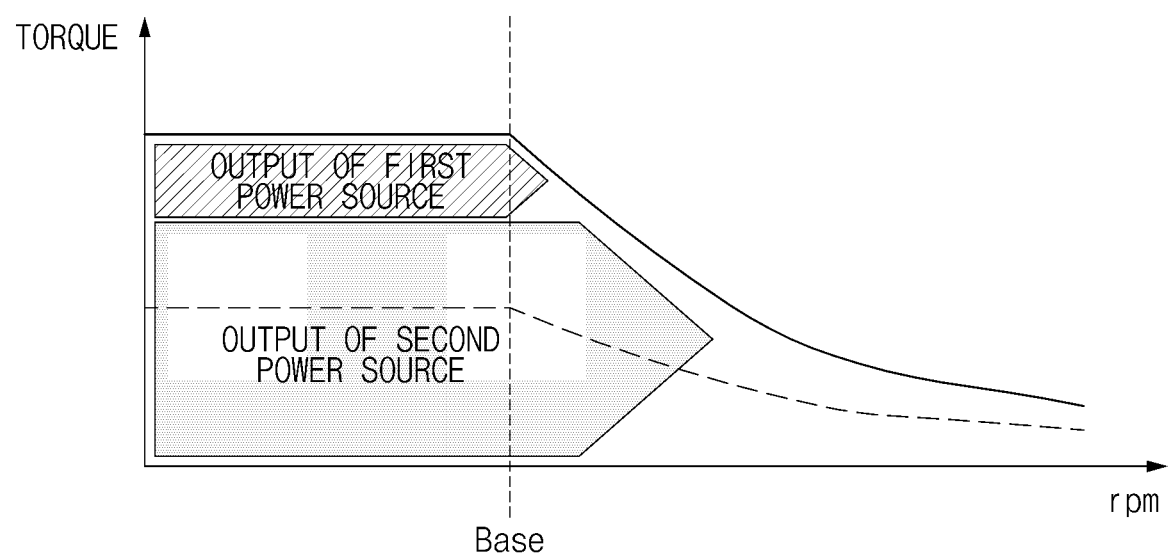
FIG. 3C is a diagram illustrating an example of a motor output in a third control mode of an output control system according to an embodiment of the present disclosure.

FIG. 3C is a diagram illustrating an example of a motor output in a third control mode of an output control system according to an embodiment of the present disclosure.

Referring to FIGS. 3A to 3C, the controller 100 may control at least one of the first power controller 200 or the second power controller 300 based on the control mode and thus may control the output of the first power source and/or the second power source.

According to an embodiment, in the first control mode, the controller 100 may allow the first power controller 200 to control the output of the first power source such that a minimum output is provided and may allow the second power controller 300 to control the output of the second power source based on a state of the motor 10. Referring to FIG. 3A, for example, the controller 100 may allow the first power controller 200 to turn off the first power source such that the output of the first power source is "0". As such, the output of the motor 10 may be provided only through the output of the second power source.

The first control mode may refer to a control mode corresponding to a state in which a temperature is increased due to the overheating that occurs when an operation time of the motor 10 increases or when a non-vehicle passes through a load-heavy slope section. In this case, to decrease the temperature of the motor 10, the motor 10 may be driven in the continuous output mode in which an output is lower than that in the short-time output mode. Accordingly, there may be no need to use all the outputs of the battery and the fuel cell for the purpose of the output of the motor 10, and the output of the motor 10 may be provided only through the output of the fuel cell. That is, the controller 100 may control the output of the battery so as to be set to a minimum output and may control the output of the fuel cell based on a state of the motor 10. For example, the controller 100 may allow the second power controller 300 to cope with a change of the output required depending on a temperature of the motor 10, that is, may control the output of the fuel cell so as to cope with the output change.

According to an embodiment, in the second control mode, the controller 100 may allow the second power controller 300 to fix the output of the second power source to a given value and may allow the first power controller 200 to control the output of the first power source based on a state of the motor 10. According to an embodiment, the second control mode may be the standby mode. The standby mode may include the case where the driving mode of the motor 10 frequently transitions between the short-time output mode and the continuous output mode, for example, the case where there is repeatedly performed a load-heavy operation of the motor 10. Accordingly, to prevent the overload of the fuel cell due to a frequent mode transition of the motor 10, under control of the controller 100, the output of the fuel cell may be fixed to a given value, and a variably required output of the motor 10 may be provided to correspond to the output of the battery.

According to an embodiment, in the second control mode, the given value of the second power source may be an output value in the continuous output mode of the motor 10. The driving mode of the motor 10 may repeatedly transition between the continuous output mode and the short-time output mode in the standby mode, but the output of the motor 10 may not decrease to less than the output value of the continuous output mode in the transition process. Accordingly, when the output value of the fuel cell is fixed to the output value of the motor 10 in the continuous output mode, the output value of the fuel cell may not fluctuate in the driving mode transition process of the motor 10, and thus, the fuel cell may be protected. As such, the stability of the fuel cell may be improved, and the lifetime of the fuel cell may increase. It may be confirmed from FIG. 3B that the controller 100 fixes the output of the second power source to the output value of the motor 10 in the continuous output mode and controls only the output of the first power source.

According to an embodiment, in the third control mode, the controller 100 may control the first power controller 200 and/or the second power controller 300 such that a sum of the output of the first power source and the output of the second power source is equal to an output value of the motor 10 in the short-time output mode. When the motor 10 is driven in the short-time output mode, because the output of the motor 10 does not vary, the sum of the output of the first power source and the output of the second power source may be uniform. Accordingly, the output of the fuel cell may not change sharply.

According to the above description, the output control system 1 may optimally control the outputs of the fuel cell and the battery and thus may prevent unnecessary power waste (or consumption). Also, when the standby mode is set, the output of the fuel cell may be fixed to a uniform value, and thus, a sharp change in the output of the fuel cell may be prevented. This may mean that the stability of the fuel cell is improved and output efficiency of the fuel cell is improved.

Figure 4A:
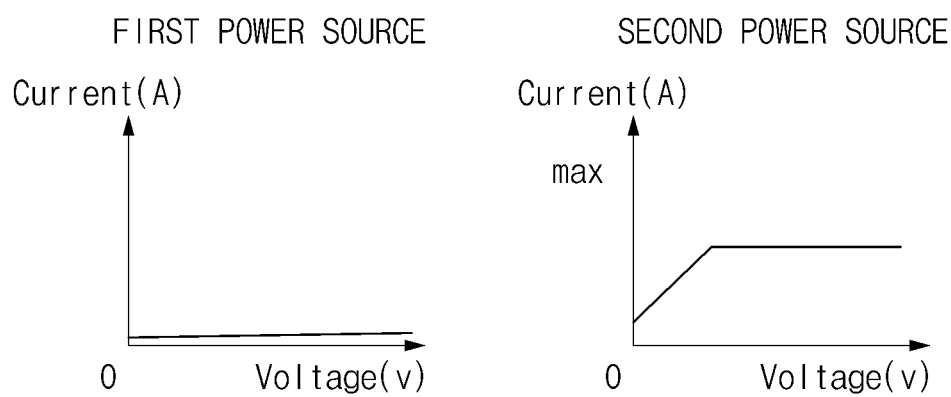
FIG. 4A is a diagram illustrating an example of an output control in a first control mode of an output control system according to an embodiment of the present disclosure.

FIG. 4A is a diagram illustrating an example of an output control in a first control mode of an output control system according to an embodiment of the present disclosure.

Figure 4B:
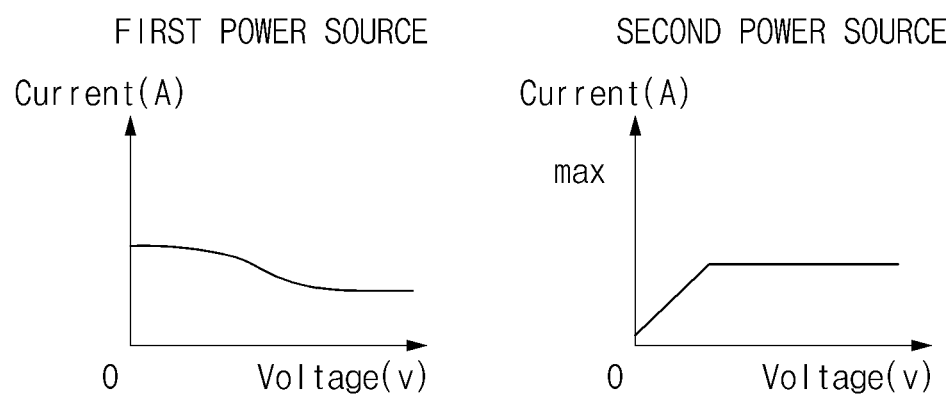
FIG. 4B is a diagram illustrating an example of an output control in a second control mode of an output control system according to an embodiment of the present disclosure.

FIG. 4B is a diagram illustrating an example of an output control in a second control mode of an output control system according to an embodiment of the present disclosure.

Figure 4C:
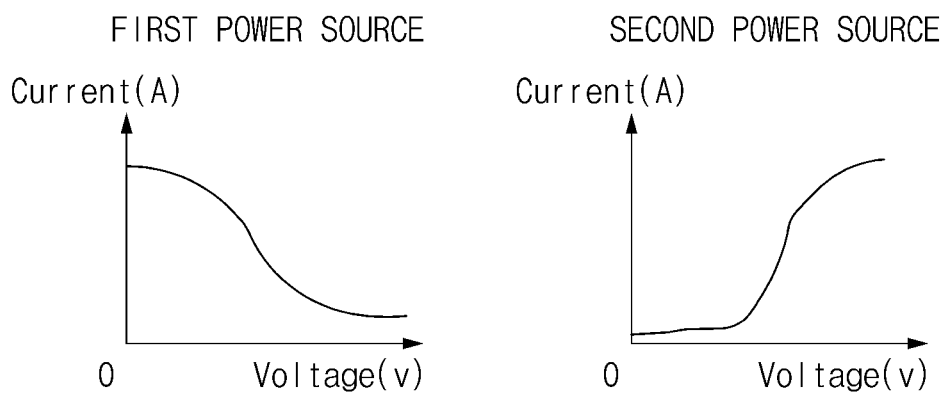
FIG. 4C is a diagram illustrating an example of an output control in a third control mode of an output control system according to an embodiment of the present disclosure.

FIG. 4C is a diagram illustrating an example of an output control in a third control mode of an output control system according to an embodiment of the present disclosure.

Referring to FIGS. 4A to 4C, the controller 100 may control at least one of the first power controller 200 or the second power controller 300 based on the control mode and thus may control the output of the first power source and/or the second power source. According to an embodiment, the controller 100 may control a current from the first power source and a current from the second power source so as to correspond to the output control of the first power source and the second power source.

According to an embodiment, in the first control mode, the controller 100 may control the current of the battery so as to be set to a minimum current. Also, in the second control mode, the controller 100 may control the current of the fuel cell so as to be set to a given value.

Figure 5:
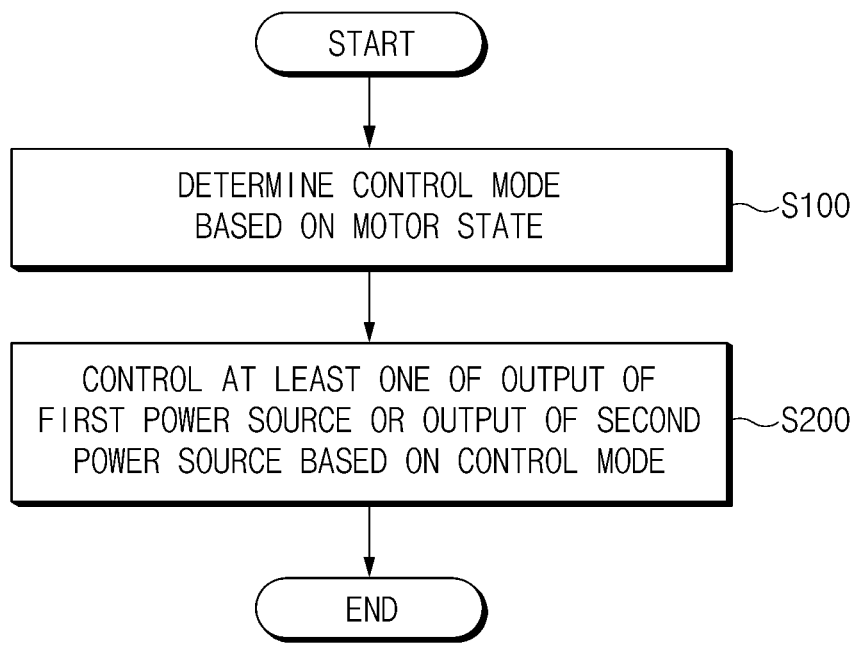
FIG. 5 is a flowchart for describing an output control method according to an embodiment of the present disclosure.

FIG. 5 is a flowchart for describing an output control method according to an embodiment of the present disclosure.

Referring to FIG. 5, the output control method may include determining a control mode based on a state of a motor (S100) and controlling at least one of an output of a first power source and an output of a second power source (S200).

In S100, the controller 100 may control the control mode based on the state of the motor.

In S200, the controller 100 may control at least one of the first power controller 200 or the second power controller 300. In this case, the first power controller 200 may control the output of the first power source, and the second power controller 300 may control the output of the second power source. Also, the controller 100 may control a current from the first power source and a current from the second power source so as to correspond to the output control of the first power source and the second power source.

Figure 6:
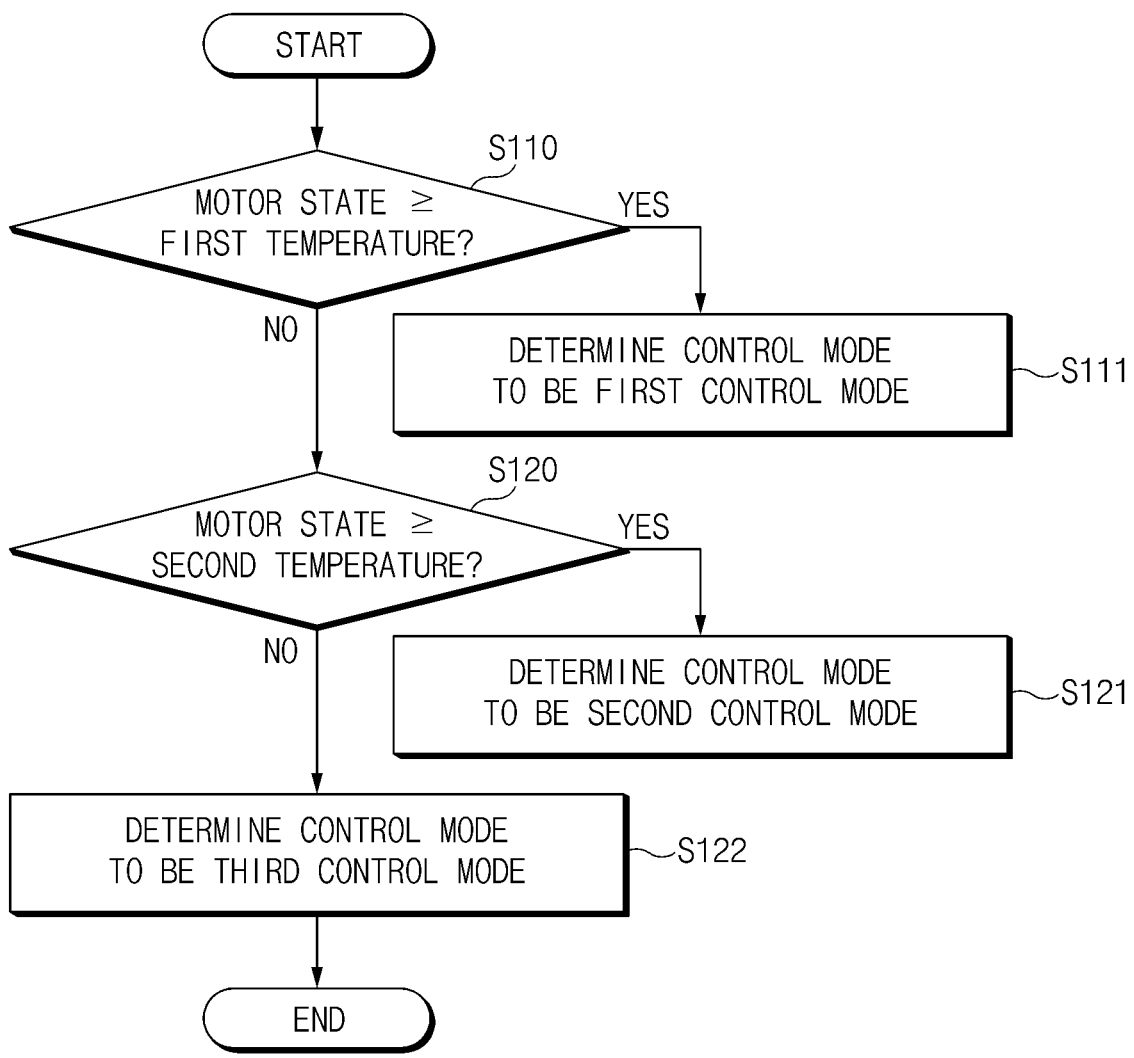
FIG. 6 is a flowchart for describing a method for determining a control mode, according to an embodiment of the present disclosure.

FIG. 6 is a flowchart for describing a method for determining a control mode, according to an embodiment of the present disclosure.

Referring to FIG. 6, the controller 100 may determine a control mode based on a result of comparing a state of a motor and a given temperature.

In S110, the controller 100 may compare the state of the motor with a first temperature.

When the state of the motor is the first temperature or more, in S111, the controller 100 may determine the control mode to be the first control mode.

In S120, the controller 100 may compare the state of the motor with a second temperature.

When the state of the motor is less than the first temperature and is the second temperature or more, in S121, the controller 100 may determine the control mode to be the second control mode.

When the state of the motor is less than the second temperature or more, in S122, the controller 100 may determine the control mode to be the third control mode.

That is, when the state of the motor is the first temperature or more, the controller 100 may determine the control mode to be the first control mode; when the state of the motor is less than the first temperature and is the second temperature or more, the controller 100 may determine the control mode to be the second control mode; when the state of the motor is less than the second temperature, the controller 100 may determine the control mode to be the third control mode. In this case, the first temperature may be set to be higher than the second temperature, and the second temperature may be set to be higher than the third temperature.

All components constituting an embodiment of the present disclosure are described above as being combined to one or operating in combination, but the present disclosure is not necessarily limited to the above embodiments. That is, within the scope of the invention, a part of all the components may be selectively combined and may perform a function(s).

In addition, the terms such as "comprise", "include", and "have" described above mean that the corresponding component may be included, unless there is a particularly contrary statement, and should be interpreted as further including another component, not excluding another component. Unless otherwise defined herein, all the terms used herein, which include technical or scientific terms, may have the same meaning that is generally understood by a person skilled in the art. Terms commonly used, such as those defined in the dictionary, should be interpreted as having a meaning that is consistent with the meaning in the context of the related art and will not be interpreted as having an idealized or overly formal meaning unless expressly defined herein.

An output control system according to embodiments of the present disclosure may optimally control the outputs of the fuel cell and the battery and thus may prevent unnecessary power waste (or consumption).

Also, when the standby mode is set, the output of the fuel cell may be fixed to a uniform value, and thus, a sharp change in the output of the fuel cell may be prevented. Accordingly, the stability of the fuel cell may be improved, and output efficiency of the fuel cell may be improved.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An output control system comprising:
a first power controller configured to control an output of a first power source;
a second power controller configured to control an output of a second power source; and
a controller configured to determine a control mode based on a state of a motor and to control one or both of the first power controller and the second power controller based on the control mode,
wherein the controller is configured to select the control mode among a short-time output mode, a continuous output mode, and a standby mode based on a driving state of the motor,
wherein the short-time output mode drives the motor with a maximum output,
wherein the continuous output mode drives the motor with a given output value, and
wherein the standby mode drives the motor with an output between the output in the short-time output mode and the output in the continuous output mode.

2. The output control system of claim 1, wherein the first power source is a battery, and the second power source is a fuel cell.

3. The output control system of claim 1, wherein the control mode includes one of a first control mode, a second control mode, and a third control mode, and
wherein the controller is configured to determine the control mode based on a temperature of the motor.

4. The output control system of claim 3, wherein the controller is configured to determine the control mode to be the first control mode, when the temperature of the motor is a first temperature or more,
wherein the controller is configured to determine the control mode to be the second control mode, when the temperature of the motor is less than the first temperature and is a second temperature or more, and
wherein the controller is configured to determine the control mode to be the third control mode, when the temperature of the motor is less than the second temperature.

5. The output control system of claim 4, wherein, in the first control mode, the controller is configured to allow the first power controller to control the output of the first power source such that a minimum output is provided and to allow the second power controller to control the output of the second power source based on the state of the motor.

6. The output control system of claim 4, wherein, in the second control mode, the controller is configured to allow the second power controller to fix the output of the second power source to a given value and to allow the first power controller to control the output of the first power source based on the state of the motor.

7. The output control system of claim 6, wherein the given value is an output value of the motor in the continuous output mode.

8. An output control method comprising:
determining a control mode based on a state of a motor;
selecting the control mode among a short-time output mode, a continuous output mode, and a standby mode based on the state of the motor; and
controlling one or both of an output of a first power source and an output of a second power source based on the control mode,
wherein the short-time output mode drives the motor with a maximum output,
wherein the continuous output mode drives the motor with a given output value, and
wherein the standby mode drives the motor with an output between the output in the short-time output mode and the output in the continuous output mode.

9. The output control method of claim 8, wherein the control mode includes one of a first control mode, a second control mode, and a third control mode, and
wherein the determining the control mode based on the state of the motor includes:
determining the control mode to be the first control mode, when the state of the motor is a first temperature or more;
determining the control mode to be the second control mode, when the state of the motor is less than the first temperature and is a second temperature or more; and
determining the control mode to be the third control mode, when the state of the motor is less than the second temperature.

10. The output control method of claim 8, wherein, in the second control mode, the output of the second power source is fixed to a given value, and the output of the first power source is controlled based on the state of the motor.

11. The output control method of claim 8, wherein, in the third control mode, the output of the first power source is controlled to be set to a minimum output, and the output of the second power source is controlled based on the state of the motor.

12. An output control system comprising:
a first power controller configured to control an output of a first power source;
a second power controller configured to control an output of a second power source; and
a controller configured to determine a control mode based on a state of a motor and to control one or both of the first power controller and the second power controller based on the control mode, wherein the controller is configured to allow the first power controller to control the output of the first power source such that a minimum output is provided and to allow the second power controller to control the output of the second power source based on the state of the motor.

13. The output control system of claim 12, wherein the first power source is a battery, and the second power source is a fuel cell.

* * * * *